United States Patent
Jameson et al.

(10) Patent No.: US 6,564,322 B1
(45) Date of Patent: May 13, 2003

(54) METHOD AND APPARATUS FOR WATERMARKING WITH NO PERCEPTIBLE TRACE

(75) Inventors: David H. Jameson, Chappaqua, NY (US); Charles P. Tresser, Mamaroneck, NY (US); Chai W. Wu, Poughquag, NY (US); Steven R. Abrams, New City, NY (US); Shmuel Windgrad, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/237,226

(22) Filed: Jan. 26, 1999

(51) Int. Cl.$^7$ ................................................. H04L 9/00
(52) U.S. Cl. ....................................... 713/176; 713/179
(58) Field of Search ................................. 713/176, 179

(56) References Cited

U.S. PATENT DOCUMENTS 5,574,787 A * 11/1996 Ryan ............................. 380/49
5,646,997 A * 7/1997 Barton .......................... 380/49
5,930,367 A * 7/1999 Osawa et al.
6,085,322 A * 7/2000 Romney et al. ............. 713/176
6,158,003 A * 12/2000 Kara ............................ 713/176
6,260,146 B1 * 7/2001 Mos et al. ................... 713/176

FOREIGN PATENT DOCUMENTS

EP  0 901 276 A2 * 3/1999
EP  0 908 881 A2 * 4/1999

OTHER PUBLICATIONS

European search report dated Jul. 21, 2000.

* cited by examiner

Primary Examiner—Thomas R. Peeso
Assistant Examiner—Kambiz Zand
(74) Attorney, Agent, or Firm—Whitham, Curtis & Christofferson, P.C.; Stephen C. Kaufman

(57) ABSTRACT

A watermark in the form of an added message is attached to a digital recording so that a significant content of the recording is completely unchanged by the process in the sense that any reader commonly used for such recording will extract from the recording exactly what would have been extracted in the case the added message had not been attached. This is done by hiding the added message in the error correcting code (ECC) for the significant content of the recording.

22 Claims, 5 Drawing Sheets

METHOD AND APPARATUS FOR WATERMARKING WITH NO PERCEPTIBLE TRACE

CROSS-REFERENCE TO RELATED APPLICATION

The present application is related in subject matter to co-pending patent applications Ser. No. 09/060,026 filed Apr. 14, 1998, by D. Coppersmith, C. Greengard, C. Tresser, and C. W. Wu for "System for Protection of Goods Against Counterfeiting", and Ser. No. 09/059,498 filed Apr. 13, 1998, by D. Coppersmith, F. Mintzer, C. Tresser, C. W. Wu, and M. M. Yeung for "Secured Signal Modification and Verification with Privacy Control", which are assigned to a common assignee herewith. The disclosures of applications Ser. No. 09/060,026 and 09/059,498, are incorporated herein by reference.

DESCRIPTION BACKGROUND OF THE INVENTION

1. Field of the Invention

The present invention generally relates to a method and apparatus for preventing counterfeiting of digitally encoded media such as audio/visual and computer software compact disks (CDS) and, more particularly, to a watermarking technique with no perceptible trace so that the original data set is not modified and the authentication encoding is not obvious.

2. Background Description

Counterfeiting costs billions of dollars yearly to compact disk companies, software companies and other industries around the world. Several methods have been proposed to fight against counterfeiting. In application Ser. No. 09/060,026, a coded message is associated with the combination of the significant content of the disk and a serial number on the disk. This coded message is hidden using some least significant bits of the recording. However, musicians usually consider the standard 16-bit technology used to digitize musical signals for compact disk recording insufficient to fully render the analog music quality. As a consequence, sacrificing a few bits, or even some of the least significant bits, is considered unacceptable by music producers. It is possible to intertwine the musical signal with a coded signal not made audible by the compact disk player but, in most obvious implementations at least, this would require the use of special disk readers, a solution which is clearly unappealing from a commercial point of view. It is also possible to choose the bits carrying the authentication code according to some model for musical perception in order to minimize the audible effects of changing the audio data, but this cannot be expected to be as good as keeping the full sixteen bits.

In addition to music data files, other types of data files would better be recorded without any change of the significant content. In the case where one records something other than music, alternatives to the present invention are easily provided. However, the present invention still has a significant advantage that it is not obvious that any encoding has been used (which is possibly desirable in some contexts) and that neither a special reader nor special software is necessary at the reading end, except to extract the watermark. Thus, besides music, another important application of the present invention is provided by data such as computer program code where the data is often needed with full precision and, if the format is fixed, there is no obvious space usable to embed a protecting code to guarantee that the data have not been modified.

Thus, the main problem solved by the present invention stems from the fact that methods, such as digital watermarks in the prior art, cannot be used for several types of applications, since they modify the original data set.

SUMMARY OF THE INVENTION

It is therefore an object of the present invention to provide a method and apparatus which permits recognition whether a recording is original and/or if it has been performed by the legitimate originator.

It is another object of the invention to provide a way to authenticate a digital recording where no significant bit of the recording can be modified for purposes of the authentication.

It is a further object of the invention to provide a watermark for digital recordings to protect the recordings from counterfeiting but which does not require special apparatus for reading the recordings.

According to the invention, the basic principle is to hide all of the authentication data in the error correcting code (ECC) of the digital recording. The method of the invention can be used both to guarantee originality and to recognize counterfeiting. In the latter case, a serial number may be attached to any recording and serves, together with the significant content of the recording, to create the protecting code. A counterfeiter can only produce legitimate pairings between the serial number and the encoding by copying originals and can only duplicate as many unique, verifiable such pairs as he has access to. Depending on the size of the watermark, the probability of error in the recovered watermark due to read/write errors can be reduced by means of a second level of error correction coding.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Background on Error Correcting Codes

Consider some significant content such as a musical recording, a musical score, a set of data, a software code, etc. Such significant content can be recorded on an optical, magnetic or other suitable media after being digitized. After the digitization the significant content takes the form of a binary word (in short, word) $W = b_1 b_2 \ldots b_N$, where $b_i$, $i = 1, 2, \ldots N$, is either 0 or 1. This word will still be considered as significant content and, in fact, when we refer to the "significant content" in the sequel, we usually mean a word such as W rather than the original image, music, data set, etc. it represents. In order to record the significant content on some chosen medium, one will usually not simply record the string of $b_i$s as they appear in W. This is because the recording, the manipulation of the medium, the reading from the medium, and possibly some other factor, all can introduce errors which would, sometimes severely, alter the integrity of the significant content: for instance the music one would play according to the erroneously read W would be different—often quite different—from the music represented by W. of recording the word W, one uses what are called error correcting codes (ECC), which have precisely the virtue of allowing some errors in strings of symbols to occur while still permitting the recovery of the word W, and thereby retrieving the significant content.

Abstractly, an ECC can be thought of as given by a many-to-one map F on the set of finite words. The inverse set $F^{-1}(W)$ of any word W to be coded contains a special subset $P(F^{-1}(W))$ which has the property that a small enough number of errors (such as bit changes and/or bit omissions and/or spurious extra bit) transform any word in $P(F^{-1}(W))$ into a word of $F^{-1}(W)$. Therefore, if one records a member of the set $P(F^{-1}(W))$ one can still recover the word W, even in the face of these sorts of errors. "Error Control Coding: Fundamentals and Applications", S. Lin and D. J. Costello, Prentice-Hall, 1983, is a general reference for the subject of error correcting codes. In practice, the ECC can be defined at the level of subwords of limited length, and for definiteness, we will limit ourselves to such ECCs, although the invention could as well be used for the more general case.

Figure 1:
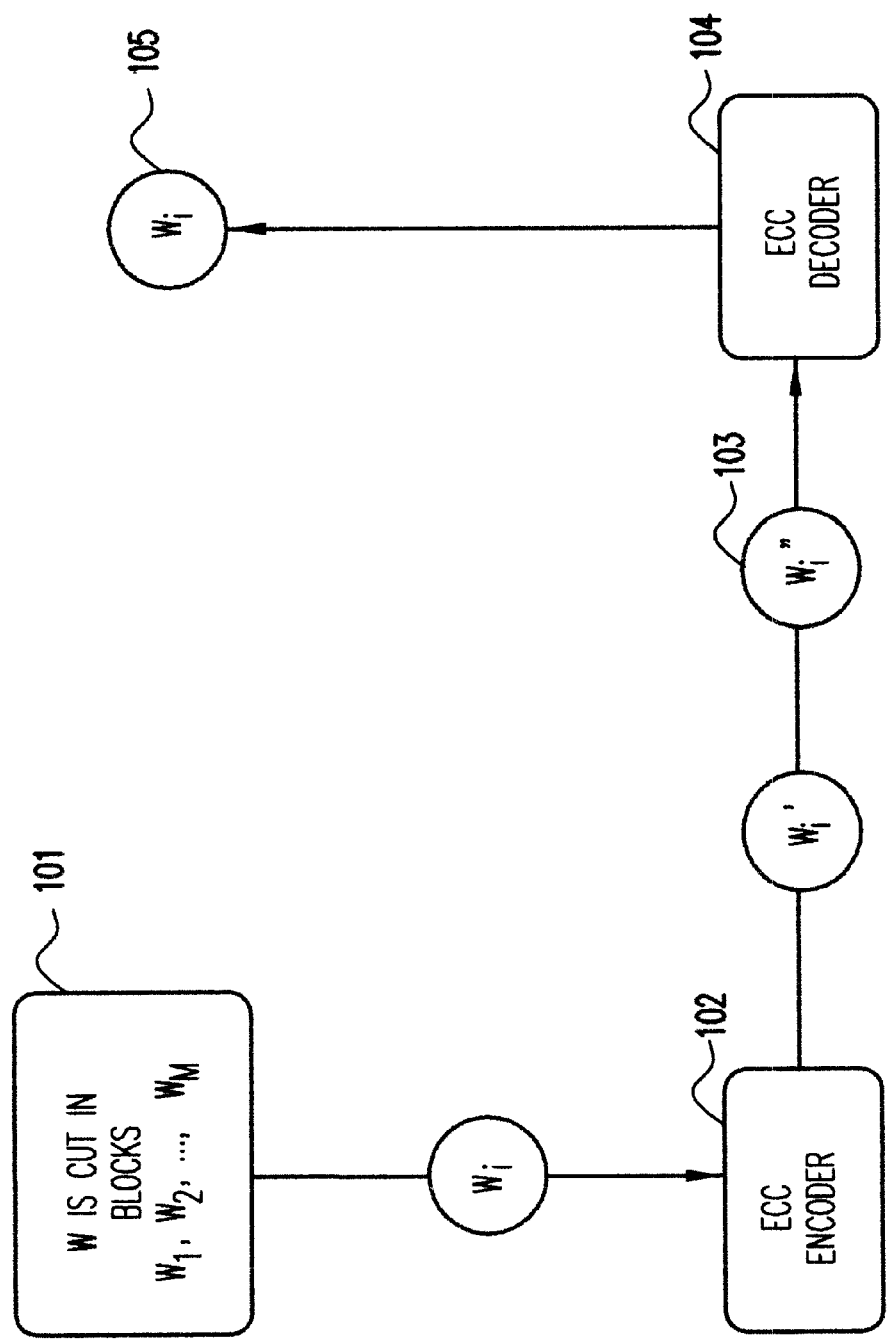
FIG. 1 is a flow diagram describing the general principle of error correcting codes (ECC) utilization in recording.

With reference to FIG. 1, there is shown a flow chart of ECC with the amount of generality needed in the rest of this disclosure, in order to facilitate the presentation of our invention. In function block 101, the word W is cut into blocks $w_1, w_2, \ldots w_N$, where each block is made of some (usually fixed) number of successive $b_i$s (i.e., in general, N is smaller than N). The ECC encoder 102 associates to each $w_1$ some other string of 0s and is denoted by $w'_i$. Each $w'_i$ is called a codeword. The ordered concatenation $w'_1 w'_2 \ldots w'_n$ of the $w'_i$s form the ECC data W'. During transmission or storage, some errors might be introduced into $w'_i$ so that, instead of $w'_i$, a corrupted codeword $w''_i$ (block 103) is recorded. While the primary purpose of the invention is to get data onto a disk, the data can also be transmitted, and the same techniques can be applied to digitally encoding data on a transmission medium. That is to say that such transmission medium typically have some significant content w, which is encoded in a particular format through the use of specific error correcting codes (i.e., these are dictated by communications protocols), yielding w', which is then encoded in a specific optical, acoustic, or electrical manner for transmission on a specific medium (such as a computer local area network such as ethernet or token ring, or through a modem for transmission on a phone line, or through a digital telecommunications medium such as ISDN, or via any wireless transmission). Our invention can be used to transmit w" instead of w'. W" again has the property that it can be read back through an ECC decoder to yield the original word w, but can also be verified for authenticity through the use of a special reader. If the number of errors is less than a specific number (which depends on the type of ECC used), then the ECC error correction unit corrects the errors and returns the uncorrupted codewords $w'_i$. When $w'_i$ is decoded in the ECC decoder 104, the word $w_i$ (output 105) is given as the output of decoder 104.

In general, the average length of $w'_i$ is bigger than that of $w_i$. What really matters is that not only $w'_i$, but also any string of 0s and 1s obtained from $w'_i$ by making at most K errors (where K and the type of allowed errors depends on the chosen ECC (and possibly on $w_i$)) is corrected by 104 and decoded by decoder 104 to generate $w_i$. In the sequel, we will always assume that K>2, which can be easily achieved by any of the currently used ECC, such as the Reed-Solomon code.

Outline of the Invention

Figure 2:
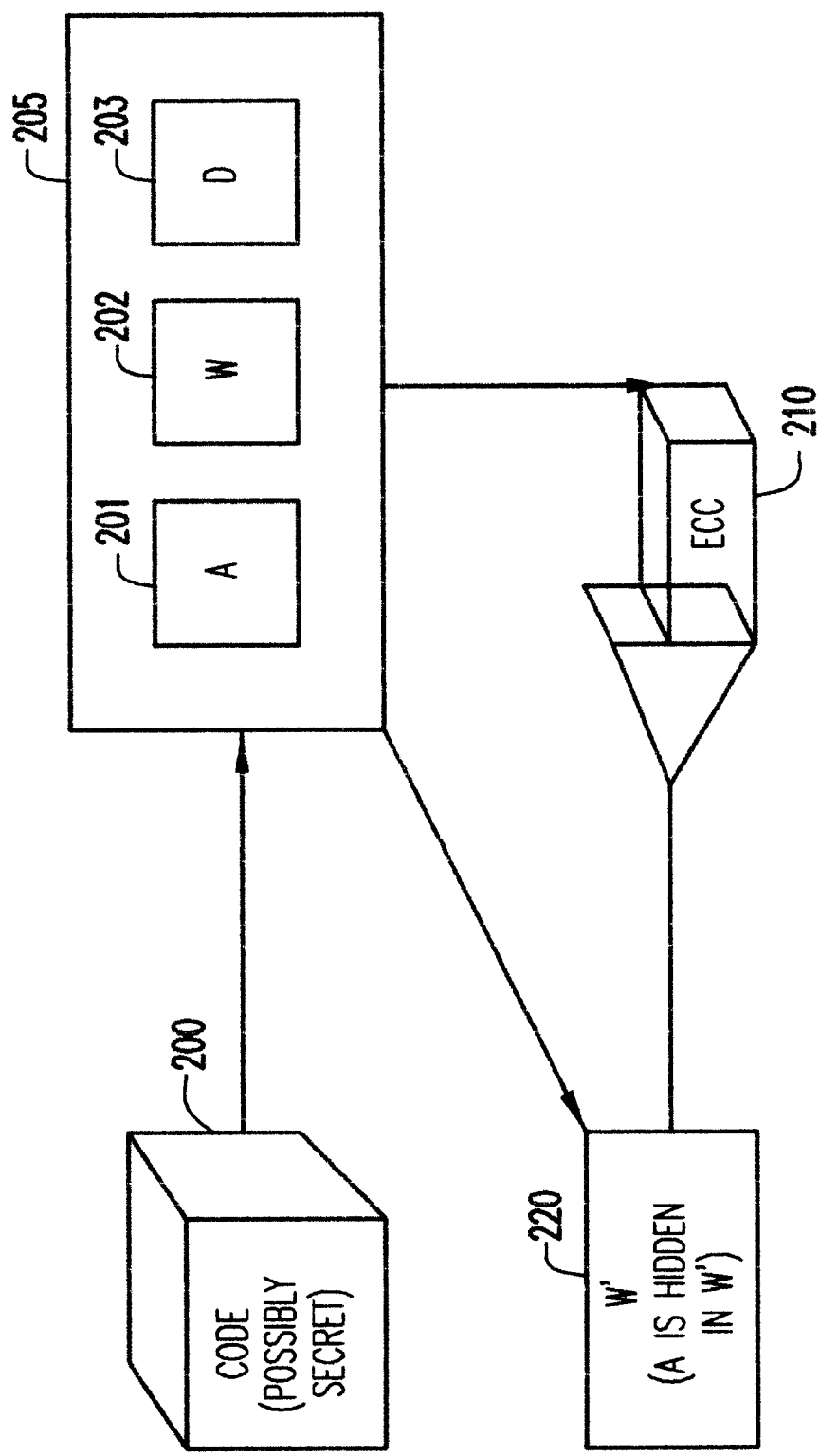
FIG. 2 is a flow diagram representing the general mechanism of the present invention.

According to the present invention, with reference to FIG. 2, some authentication data A 201 is associated to any data set W 202 to be recorded. The basic principle of the invention is to hide all of the authentication data in the error correcting code 210 used to perform the recording. Following the teaching of application Ser. No. 09/060,026, the authentication data A may be chosen to be such that the triple (A,W,D) at 205, formed by the authentication data A, the data set W, and some other auxiliary data set D 203 (associated to W or to the physical support of the recording) cannot be generated by unauthorized parties. The code used for the generation of such triples can be based on (secret or public) encryption 200. In particular, instead of the general implicit relation between A, W and D, the authentication message A may be a coded message depending on the pair (W,D), in which case we will often write C instead of the generic notation A. Depending on the precise implementation, the present invention allows recognizing the originality and/or legitimacy of recordings in such a way that the meaning of what is recorded is completely unaffected by the implementation of the invention and standard readers would neither detect nor be affected by the implementation of the invention.

We note that using some of the error correcting codes to carry authentication data may, in general, reduce the robustness of the error correction scheme. That is, while the original system may have been able to correct K errors, a system using our invention may now be able to correct K'<K errors. This is not viewed as a significant limitation of the invention, as common delivery medium such as the compact disk (CD) are capable of correcting far larger numbers of errors than are generally required (see, for example, "Phillips-Sony Red Book" or International Electrotechnical Commission standard IEC 60908 (1987-09), for detailed information on the Compact Disc standard). It will be understood by those of skill in the art that the CD standard provides certain subcode channels, i.e., channels which contain non-audio data. Any of these might trivially be used to carry digital signatures or watermarks. However, the invention still has utility for storage medium other than the standard CD, or for audio CDs in which the subcode channels are otherwise in use, as well as in the transmission medium which have no unused subcode channels. In fact, in any particular embodiment, it should be possible to carefully distribute the authentication data across the medium so as to distribute the reduction in robustness as appropriate. For example, the robustness of the error correction scheme can be compromised in less critical areas of the data set or better-protected areas of the physical medium, or evenly distributed across the data set to minimize the aggregate impact. Furthermore, in certain medium, again such as CDs, in addition to the use of error correction codes, the data is interleaved on the physical medium in a manner which makes the data recovery process exceptionally robust in the face of specific types of errors; e.g., burst-errors, and errors located in physically contiguous regions of the medium. Appropriate distribution of the additional authentication data can help preserve these sorts of robust behaviors.

A description of the specific cryptographic techniques used in this disclosure (secret key/public key (SK/PK) pairs and hash functions) can be found in *Handbook of Applied Cryptography* by Alfred J. Menezes, Paul C. van Oorschotand and Scott A. Vanstone, CRC Press, 1997.

Description of the First Preferred Embodiment of the Invention

Figure 3:
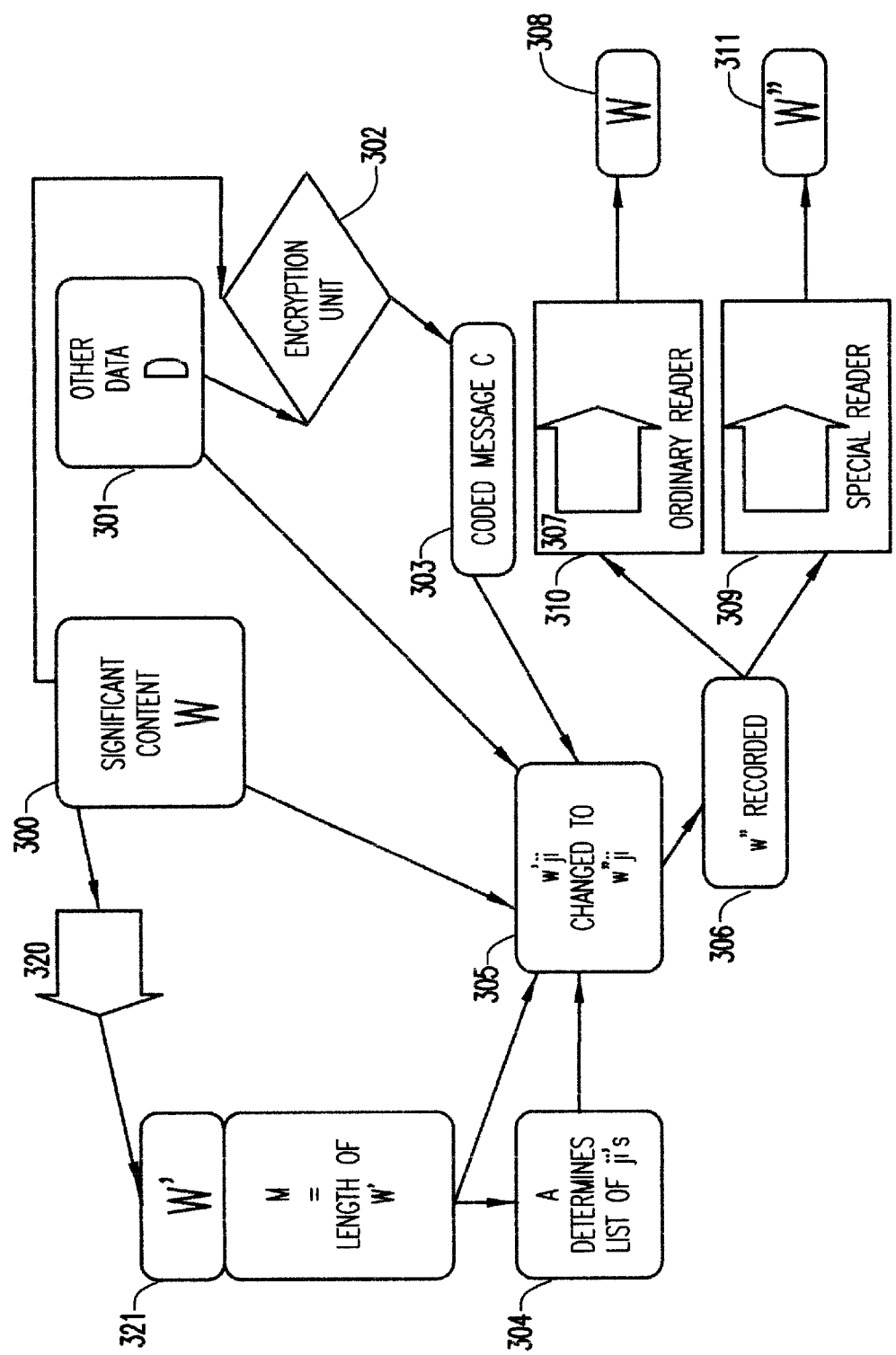
FIG. 3 is a flow diagram representing a first preferred embodiment of the present invention.

Referring now to FIG. 3, the significant content $W=w_1w_2 \ldots w_N$ at input block 300, possibly combined with supplementary data D at input block 301 (such as time, data and/or serial numbers attached physically to the recording), is encrypted by a secret key S1 in the encryption unit 302 to generate a coded message C at 303. The coded message C can be represented as some sequence $s_1s_2 \ldots s_c$ of 0s and 1s. For convenience, we will assume that the length c of C is fixed once and for all, but this is quite in essential to the invention and other conventions can be taken as well. At the ECC encoder 320, the word W is transformed to the primary error corrected word $W''=w'_1w'_2 \ldots w'_M$ of length M at 321 (in general, M is greater than N). A defined algorithm A at 304 associates to M a collection $j1<j2<\ldots<jc<M$ of addresses of coding blocks $w'_{j1}, w'_{j2}, \ldots w'_{jc}$. For instance, one can take the $w'_{ji}$s, with i in $\{1,2, \ldots c\}$, as evenly distributed along W'. The choice of (j1,j2 . . . , jc) can be either secret or known publicly. These selected coding blocks are changed in 305 into $w''_i$ according to another (possibly secret) key S2, i.e., $w'_{ji}$ is changed into $w''_{ji}$=S2$(w'_{ji}, W.D.C)$. We denote by W' the ECC transform of W, and by W'' the word obtained from W' by replacing each coding block $w'_{ji}$ by $w''_{ji}$.

The word W'' is what gets recorded at function block 306. When read with an ordinary reader 310, W'' goes through an ECC decoder 307 to yield back W 308 if there has not been too many errors.

To check that the recording is original, one needs a special reader at 309 which accesses W'' and delivers it (at block 311) without passing trough the FCC decoder 307. The mechanism for reading W'' is part of commercially available audio-CD and CD-ROM players, and will be understood by those of skill in the art. A special reader can be constructed by intercepting the signal before it reaches the error correcting circuitry.

One can then verify that C is as it should be given significant content W and other data D. More precisely because of errors, the C one reads with the special reader 309 may be slightly different from the original C. To verify authenticity of the encoding, one verifies that the rate of errors in the coding blocks is of the same order as in the rest of the recording.

Because of the errors which may occur in the coding blocks, public key encryption cannot be readily adapted to the embodiment represented in FIG. 3. We will present two embodiments allowing the use of public key encryption as this is often the most convenient method to ensure secure and easy verifiability as then several agents can verify authentication codes, but far less can generate them.

Description of a Second Preferred Embodiment of the Invention

Figure 4:
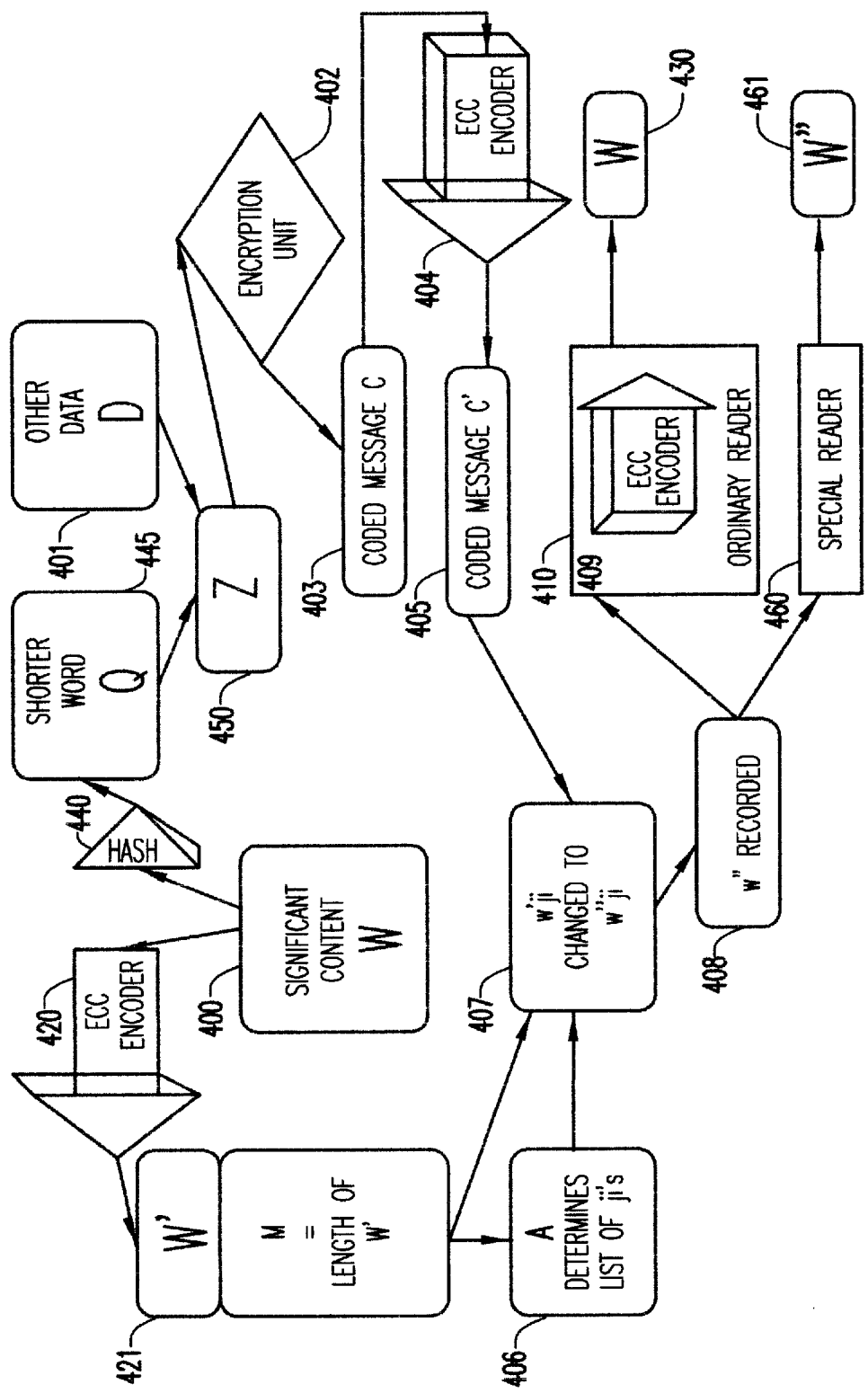
FIG. 4 is a flow diagram representing a second preferred embodiment of the present invention.

With reference now to FIG. 4, the significant content $W=w_1w_2 \ldots w_N$ at input block 400 goes through a secure, publicly known, hash function at function block 440 to yield a much shorter word Q at output 445. The word Q is then possibly concatenated with supplementary data $D=x_1x_2 \ldots xd$ at input block 401 (such as time, data and/or serial numbers attached physically to the recording) to form a word $Z=u_1u_2 \ldots u_p$ at output 450 (if there is no D, Z is just Q). The word is encrypted by a secret key S1 in the encryption unit 402, the secret key being now chosen as the secret part of a secret key/public key (SK/PK) pair, to generate a coded message C of length c at output 403. The coded message C can be represented as some sequence $s_1s_2 \ldots s_c$ of 0s and 1s.

At the ECC encoder 420, the word W is transformed to the word $W'=w'_1w''_2 \ldots w'_M$ of length M at output 421 (in general, M is greater than N). Next a second ECC encoder at 404, converts C into ECC code words $C'=t_1t_2 \ldots t_c$ of length c'>c at output 405. Note that the second error correcting code used at ECC encoder 404 does not have to be the same as the ones used at ECC encoder 420. To distinguish this ECC encoder/decoder pair from the first ECC encoder/decoder pair, we will call this the secondary ECC encoder/decoder.

A defined algorithm A at function block 406 associates to M a collection $j1<j2<\ldots<jc'<M$ of addresses of coding blocks $w'_{j1}, w'_{j2}, \ldots w'_{jc'}$. For instance, one can take the $w'_{ji}$s, with i in $\{1,2, \ldots c\}$, as evenly distributed along W'. The choice of (j1,j2, . . . , jc') should be known publicly, or at least by whomever one wants to be able to check the authenticity of the recording. These selected coding blocks are changed in function block 407 into $w''_{ji}=f(t_i, w_{ji})$ in such a way that w'' can be interpreted as a 0 or a 1 according to a publicly known rule. Also, the function f is such that there is a map g satisfying $t_i=g(w''_{ji})$. We denote by W' the ECC transform of W, and by W'' the word obtained from W' by replacing each coding block $w'_{ji}$ by $w''_{ji}$. The word W'' is such that any reading of the word $w''_{j1}w''_{j2} \ldots w''_{jc}$ which is not to much spoiled by errors is interpreted as C by running the secondary ECC decoder on the word $g(w''_{j1})g(w''_{j2}) \ldots g(w_{jc}')$ The word W'' is what gets recorded at 408. When read with an ordinary reader 410, W'' goes through an ECC decoder at 409 to yield back W at output 430 if there has not been too many errors.

To check that the recording is original, one needs a special reader (as described previously) at 460 which accesses W'' and delivers it without passing through the ECC decoder.

One can then verify that C is as it should be given W and D, using the public part of the SK/PK pair. This check of authenticity may be performed by a specialized reader which also outputs the significant content W, so that authentication can be performed while inspecting W. In case this invention is used to protect retail items, the manufacturer may require the retailers selling its brand to use only such an authenticating reader when customers want to inspect W.

Description of a Third Preferred Embodiment of the Invention

Figure 5:
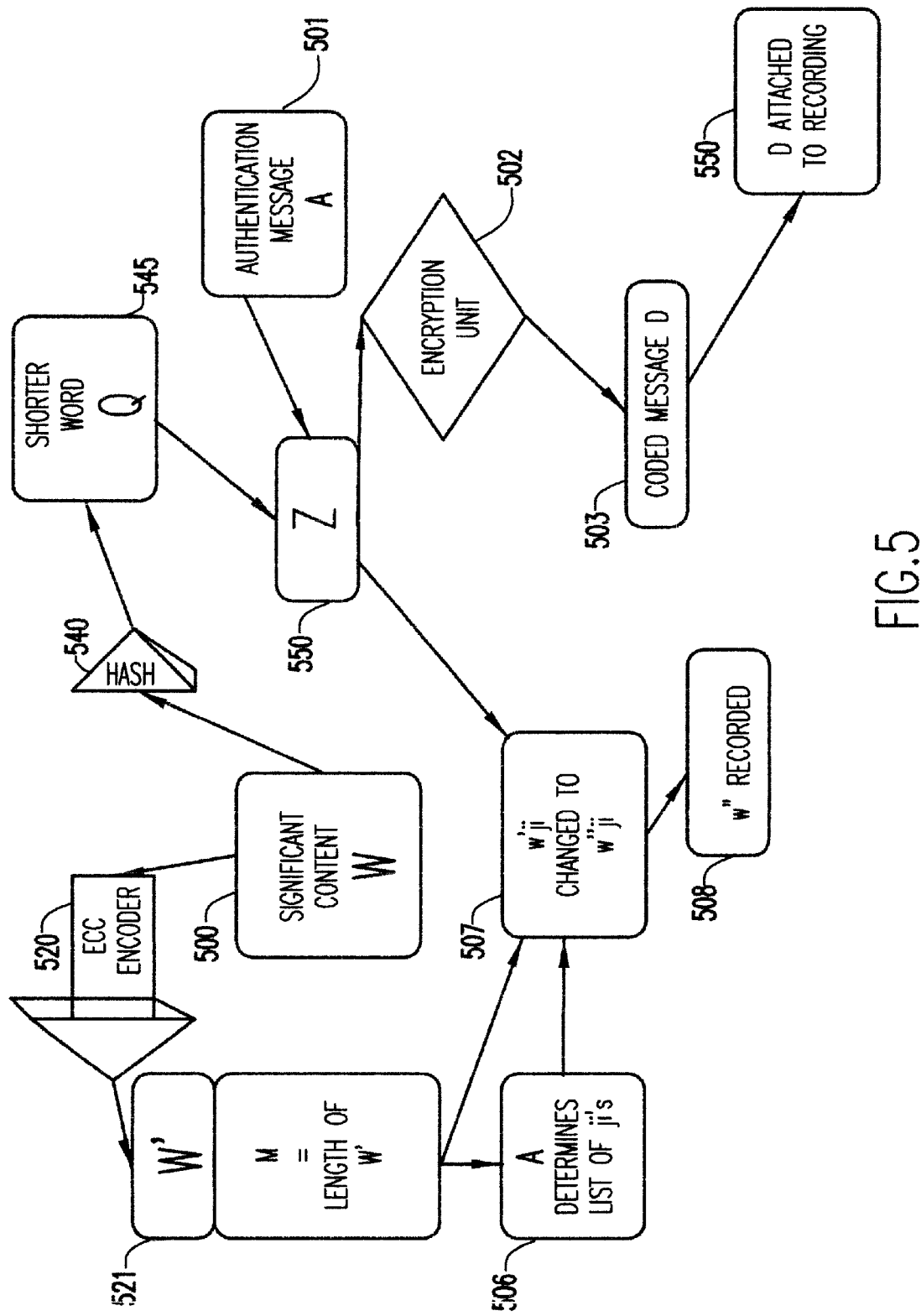
FIG. 5 is a flow diagram representing a third preferred embodiment of the present invention.

With reference now to FIG. 5, the significant content $W=w_1w_2 \ldots w_N$ at input block 500 goes through a secure, publicly known, hash function at function block 540 to yield a much shorter word Q at 545. The word Q is then concatenated with an authentication message $A=u_1u_2 \ldots u_a$ at input block 501 to form a word $Z=t_1t_2 \ldots t_p$ at output 550. The word Z is encrypted by the secret part S1 of a SK/PK pair in the encryption unit 502 to generate a coded message D at output 503.

At the ECC encoder 520, the word W is transformed to die word $W'=w'_1w'_2 \ldots w'_M$ of length M at 521 (in general, M is greater than N). A defined algorithm A at function block 506 associates to M a collection $j1<j2<\ldots<jc'<M$ of addresses of coding blocks $w'_{j1}, w'_{j2}, \ldots, w'_{jc'}$. For instance, one can take the $w'_{ji}$s, with l in $\{(1,2, \ldots c\}$, as evenly distributed along W'. The choice of (j1,j2, . . . , jc') should be known publicly, or at least by whomever one wants to be able to check the authenticity of the recording. These selected coding blocks are changed in function block 507 into $w''_{ji}=f(u_i,w_{ji})$ in such a way that $w''$ can be interpreted as a 0 or a 1 according to a publicly known rule. Also, the function f is such that there is a map g satisfying $u_i=g(w''_{ji})$. Again the choice of f and g should be known publicly, or at least by whomever one wants to be able to check the authenticity of the recording. We denote by W'' the ECC transform of W, and by W'' at 508 tie word obtained from W' by replacing each coding block $w'_{ji}$ by $w''_{ji}$. A specialized reader can extract the word Z from the recording.

Because of errors, what is actually read (assuming the recording is authentic) will be a approximation Z' to Z, this approximation being close if there are not yet too many errors. The word D is also attached to the recording at 550 (for instance in the form of a bar code on the physical support of the recording) and one checks authenticity by verifying that Z' is close enough to the word Z extracted from D by the public part of the SK/PK pair.

While the invention has been described in terms of three preferred embodiments, those skilled in the art will recognize that the invention can be practiced with modification within the spirit and scope of the appended claims.

What is claimed is:

1. A method for attaching an added message to a digital message embodied in physical support media so that the significant content of the digital message is completely unchanged comprising the steps of hiding the added message in an error correcting code for the significant content of the digital message and encrypting at least a portion of the significant content to generate the added message, wherein the step of encrypting uses a public key encryption method, said method having a public key/private key pair and being used to ensure that the hidden message is provided by a party having access to said private key, and further being used to protect said hiding step, and wherein a unique identifier associated with said physical support media is attached to said added message.

2. The method of claim 1, wherein two or more layers of error correction are used in the error correcting code.

3. The method of claim 1, wherein a second data set is attached to said physical support of the digital message.

4. The method of claim 3, wherein the second data set is derived from said unique identifier associated with said physical support.

5. The method of claim 4 further comprising the step of reading said added message to check that the physical support of the digital message has not been counterfeited.

6. The method of claim 1, further comprising the step of reading said added message to check that the significant content of the digital message is authentic.

7. The method of claim 1 wherein the digital message is stored in a recording.

8. The method of claim 7 further comprising the steps of:
   decoding the error correction code; and
   reading the added message to check that the physical support of the recording has not been counterfeited.

9. The method of claim 7 further comprising the steps of:
   decoding the error correction code; and
   reading said added message to check that the significant content of the recording is authentic.

10. The method of claim 1 further comprising the step of transmitting the added message and the significant content.

11. The method of claim 1 wherein the digital message is transmitted over a transmission medium, and said added message is hidden in the error correcting code specific to said transmission medium.

12. A method for attaching an added message to a digital message embodied in physical support media so that a significant content of the digital recording is completely unchanged, comprising the steps of:
   selecting an added message that is to be attached to the significant content;
   associating the added message with the significant content;
   selecting an error correction code for the significant content;
   hiding the added message within the error correction code and
   encrypting at least a portion of the significant content to generate the added message, wherein the step of encrypting uses a public key encryption method,
   wherein a unique identifier associated with said physical support media is attached to said added message.

13. The method of claim 12 wherein the digital message is stored in a recording.

14. The method of claim 12 wherein the digital message is transmitted over a transmission medium.

15. A computer system that has an apparatus for making a digital recording, said computer system comprising:
   a means for recording a significant content onto a recording medium;
   a means for associating an added message with said significant content;
   a means for selecting an error correction code for the significant content;
   a means for hiding the added message within said error correction code; and
   a means for encrypting at least a portion of the significant content to generate the added message, wherein the encrypting means uses a public key encryption method,
   wherein a second data set derived from a unique identifier associated with said recording medium is attached to said added message.

16. A computer system that has an apparatus for transmitting a digital message, said computer system comprising:
   a means for generating a digital message with a significant content;
   a means for associating an added message with said significant content;
   a means for selecting an error correction code for the significant content;
   a means for hiding the added message within said error correction code;
   a means for transmitting the added message and the significant content; and
   a means for encrypting at least a portion of the significant content to generate the added message, wherein the encrypting means uses a public key encryption method,
   wherein a unique identifier associated with a physical support media of said digital message is attached to said added message.

17. A program storage device readable by a machine, tangibly embodying a program of instructions executable by the machine to perform method steps for attaching an added message to a digital recording so that a significant content of the digital recording is completely unchanged, said method steps comprising hiding the added message in an error correcting code for the significant content of the digital recording and encrypting at least a portion of the significant content to generate the added message, wherein the step of encrypting uses a public key encryption method, and wherein a unique identifier associated with a physical support media of said digital recording is attached to said added message.

18. A program storage device readable by a machine, tangibly embodying a program of instructions executable by the machine to perform method steps for attaching an added message to a digital recording so that a significant content of the digital recording is completely unchanged, said method steps comprising:

associating an added message with the significant content;

selecting an error correction code for the significant content;

hiding the added message in an error correcting code for the significant content of the recording; and encrypting at least a portion of the significant content to generate the added message, wherein the step of encrypting uses a public key encryption method, and wherein a unique identifier associated with a physical support media of said digital recording is attached to said added message.

19. The method of claim 12, wherein the added message is protected by a secondary error correction code.

20. The method of claim 12, wherein a copy of the added message is affixed to said media containing the digital message.

21. The method of claim 20, wherein the added message is derived from properties of the media.

22. The method of claim 21, wherein the media is a compact disk.

* * * * *